Patented Dec. 4, 1923.

1,476,152

UNITED STATES PATENT OFFICE.

ELIE DELAFOND, OF HABANA, CUBA.

RECOVERY OF SUGAR FROM SUGAR-CANE MUD.

No Drawing.   Application filed February 12, 1920.   Serial No. 358,019.

*To all whom it may concern:*

Be it known that I, ELIE DELAFOND, a citizen of the United States of America, residing at Habana, Cuba, have invented certain new and useful Improvements in the Recovery of Sugar from Sugar-Cane Mud; and I do hereby declare the following to be a full, clear, and exact description of the invention, such as will enable others skilled in the art to which it appertains to make and use the same.

At the present the "mud" or residue in sugar manufacture is separated by filter presses, and is known as "press cake." The sugar remaining in these cakes is lost. The mud from the defecators is placed in decanters and allowed to settle for an hour or more, the clear liquid is returned to the defecators and the mud passed through the filter press.

The mud, before going to the filter press, contains about ten per cent of sugar, and the object of my invention is to recover this sugar as a thin juice and return it into the cycle of operations.

To this end I dilute the mud with about four times its volume of water, preferably cold water, so as to re-dissolve as little as possible of the organic and inorganic materials rendered substantially insoluble by the usual defecation process.

The mixture of water and mud is allowed to settle in the decanting apparatus, and the clear solution is drawn off and used in lieu of water for the cane at the first grinding mill.

The mud contains now only about two per cent saccharose, and may be mixed with another four volumes of water, allowed to settle, and decanted; this clear liquid also being used for the moistening of the cane at the first mill. This leaves about four-tenths per cent of saccharose in the mud. If found practicable the operation may be repeated again to reduce the saccharose content to about .08 per cent.

The washing may be repeated as often as desired.

In order, however, to coagulate the albuminoids and to harden the pectines, so as to render these substances separable by decantation, I add a coagulant to either the mud or decanted solution, ozone, oxygen, sulphur dioxide or formaldehyde, preferably the last mentioned, in proportion of about one volume of formaldehyde to 25,000 volumes of mud to be treated. The coagulants are supplied to the mud in any well known manner, either before or after dilution, by allowing the coagulants to bubble through the mud while contained in a closed vessel or otherwise.

Formaldehyde is preferred for the reason that any excess that may remain in the clear liquor is completely evaporated when the liquid is used on the crushed cane or bagasse leaving the mill. It also does not act on or change the sugar in any harmful manner, and leaves no residue in the solution.

The coagulant also prevents the inversion of the sugar.

I thus remove more sugar or saccharose from the mud than by the troublesome and costly filter presses, and obtain a solution, though much diluted, that is used in the early stages of cane sugar making, thus returning practically all the sugar content of the mud into the cycle of operations, to be finally recovered in the later stages of the process with the raw sugar.

I claim—

The method of sugar recovery, which comprises diluting press-cake or mud with cold water and formaldehyde, allowing the mud to settle, decanting the thin liquor containing some formaldehyde and applying this thin juice to the cane passing through the sugar mill, thereby supplying water for the crushing operation and some formaldehyde for at once coagulating gums and pectines and preventing inversion of the sugar in the juice from the fresh quantity of cane being crushed, and at the same time returning sugar from the mud into the cycle of operations for recovery therein.

In testimony that I claim the foregoing as my invention, I have signed my name hereto.

ELIE DELAFOND.